4 Sheets--Sheet 1.

G. P. GORDON.

PRINTING-PRESS.

No. 7,364. Reissued Oct. 24, 1876.

WITNESSES.

Henry R. Gordon

C. D. Gordon

George P. Gordon by O. Fitzroy Doan atty

INVENTOR

4 Sheets—Sheet 2.

G. P. GORDON.

PRINTING-PRESS.

No. 7,364. Reissued Oct. 24, 1876.

WITNESSES.

Henry R Gordon

C. D. Gordon

George P. Gordon by his atty Aspinwall & Green

INVENTOR.

4 Sheets—Sheet 3.

G. P. GORDON.

PRINTING-PRESS.

No. 7,364. Reissued Oct. 24, 1876.

WITNESSES

Henry R. Gordon

C. O. Gordon

George P. Gordon by A. Sidney Doane atty

INVENTOR.

G. P. GORDON.

PRINTING-PRESS.

No. 7,364.

Reissued Oct. 24, 1876.

WITNESSES

Henry R. Gordon

L. O. Gordon

George P. Gordon by Affleck, Frame & Co

INVENTOR.

UNITED STATES PATENT OFFICE.

GEORGE P. GORDON, OF BROOKLYN, NEW YORK.

IMPROVEMENT IN PRINTING-PRESSES.

Specification forming part of Letters Patent No. 34,111, dated January 7, 1862; reissue No. 7,364, dated October 24, 1876; application filed November 10, 1875.

*To all whom it may concern:*

Be it known that I, GEORGE P. GORDON, of Brooklyn, Kings county, in the State of New York, did invent, make, and apply to use certain new and useful Improvements in Printing-Presses; and I do declare the following to be a full, clear, and correct description of the same, reference being had to the accompanying drawings, making a part of this specification, and to the letters of reference marked thereon, in which—

Figure 1:
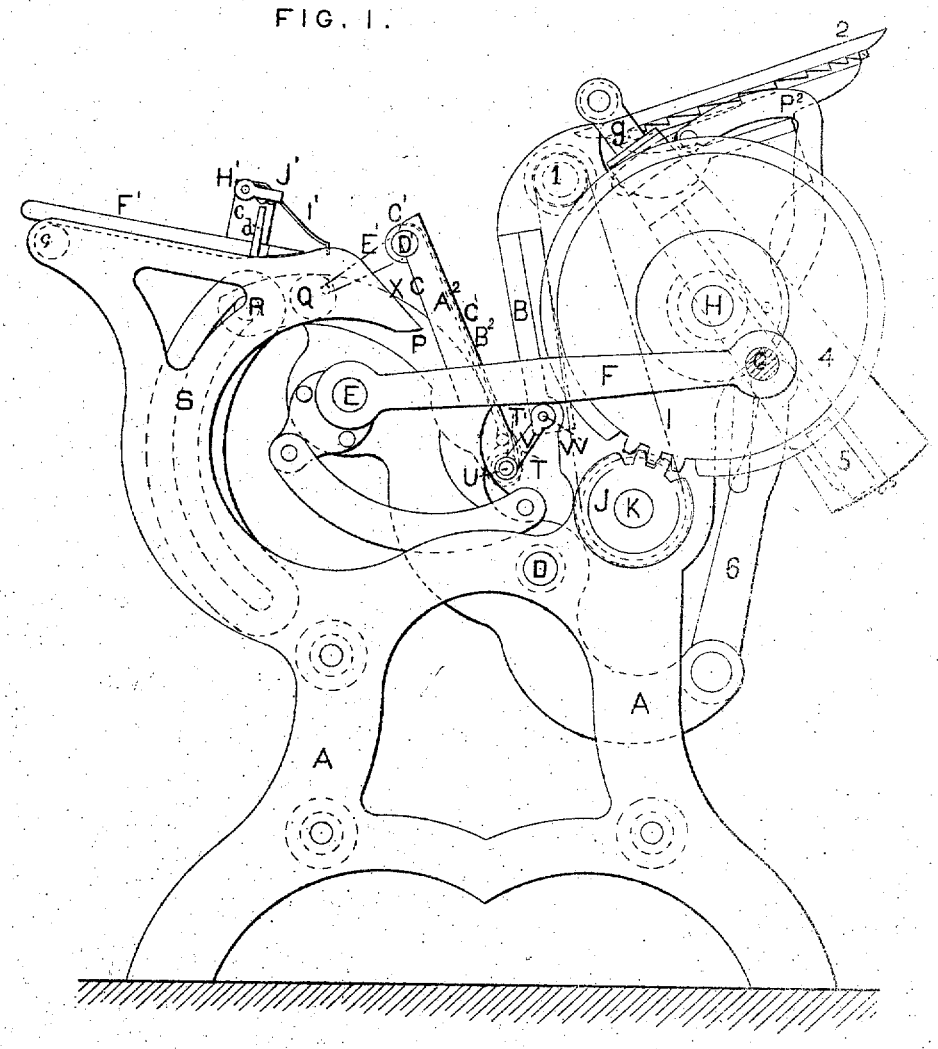
Figure 2:
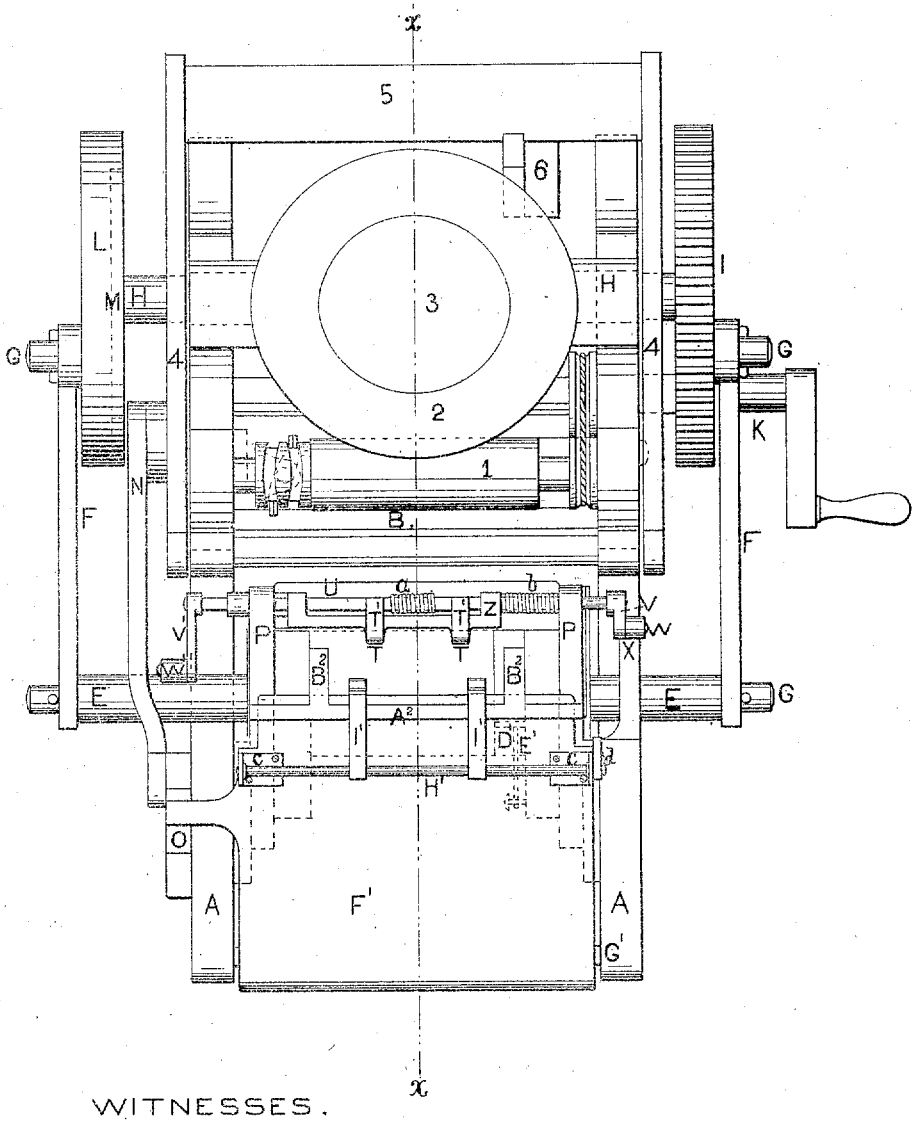
Figure 3:
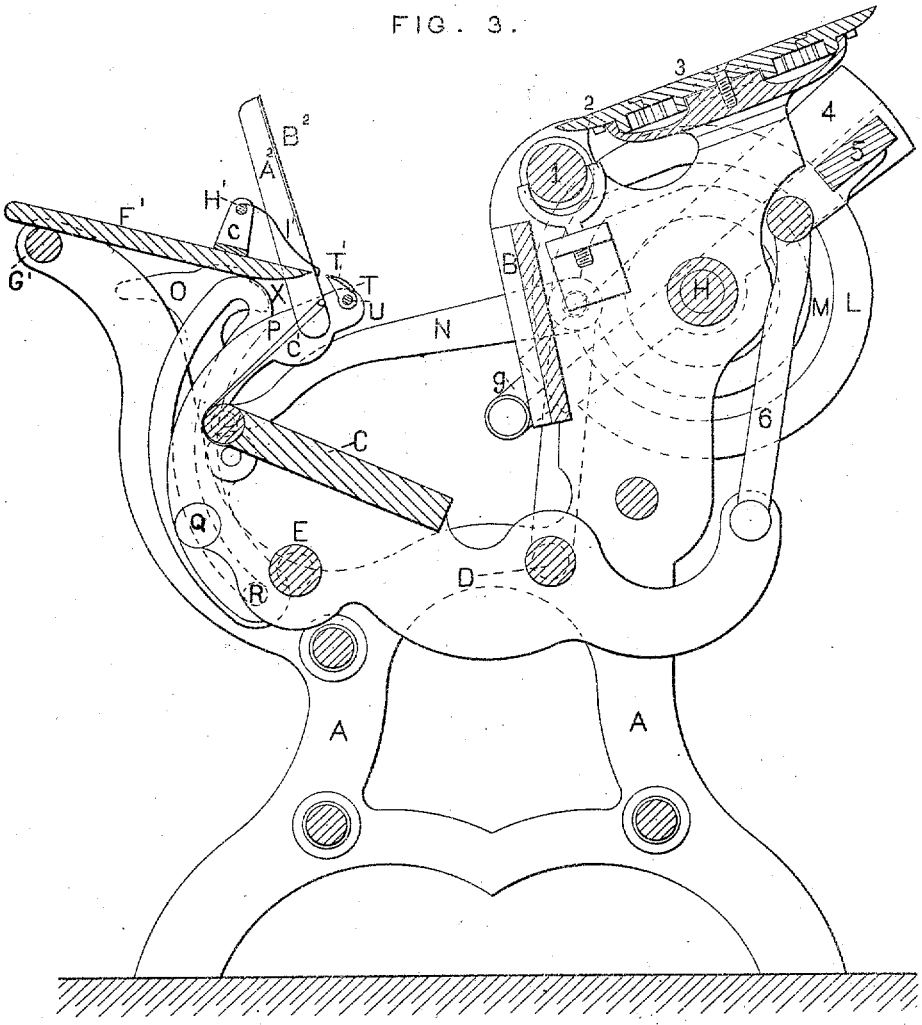
Figure 4:
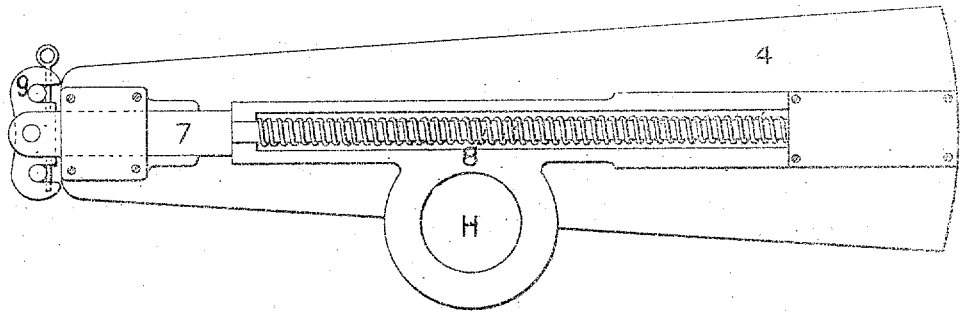
Figure 5:
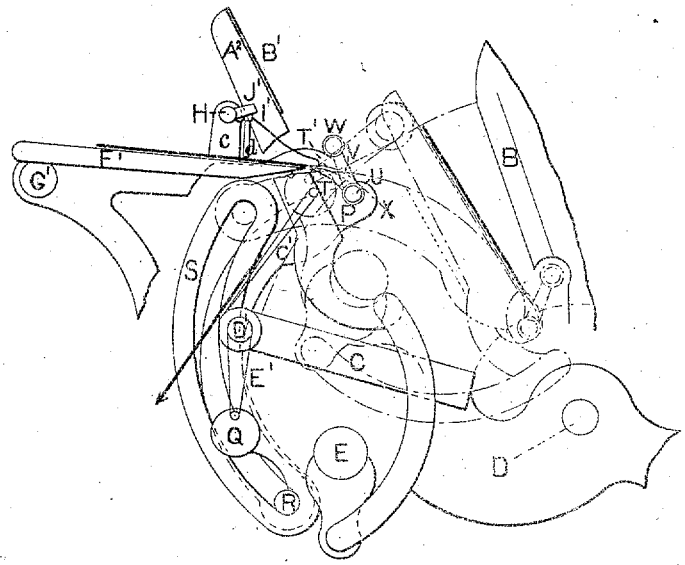

Figure 1 is a side elevation of my improved printing-press; Fig. 2, a top elevation of the same; Fig. 3, a transverse sectional view of the same through line X in Fig. 2; Fig. 4, a view showing roller-arm employed; Fig. 5, sectional view of feed-table and vibrating platen employed.

In the drawings, like parts of the invention are indicated by the same letters of reference.

The nature of the present invention consists in certain improvements in the construction of a printing-press, as more fully hereinafter described.

To enable those skilled in the art to make and use my invention, I will speak of its construction and operation.

A A show a frame for supporting the operative parts of my improved printing-press, and B is a stationary bed, in which the form or types is placed and held. C is a platen supported by, and vibrating upon, the shaft D. E is a shaft passing through the back of the vibrating platen C, to which shaft E are attached the connecting-rods F operated by the cranks G. H shows the main or driving shaft, having upon one side the large cog-wheel I gearing into the pinion J upon the fly-wheel shaft K, while upon the other side of the shaft H is the blank L, having cut upon its inner side the cam M, which cam M, through the lever-connection N, serves to operate the trip O, as hereinafter described. At the upper part of the back of the vibrating platen C are the nipper-arms P, hung upon the centers Q, upon which they rock to and from the feed-table F′. At the lower extremities of these nipper-arms P the rollers R are pivoted, which rollers R play in the stationary cams S upon the inner sides of the frame A A, the object of these stationary cams S being to guide and move the nipper-arms P to and from the feed-table F′, when said nipper-arms P are operated by the motion of the vibrating platen C. The nippers T and T′ are attached to the rod U, which rod U passes through the forward or upper ends of the nipper-arms P. The under nippers T are made in the shape of a yoke, having for its center the rods U, upon which are attached the upper nippers T′, one end of the yoke running through the support Z, to which end is attached the crank-arm V with its roller W. To the opposite end of the rod U is attached the crank-arm V′ with its roller W′. The object of the crank-arm V is, upon the return movement of the nipper-arms P, to impinge upon the bracket X, and raise the nippers T and T′ with the printed sheet from the paper tympan-sheet C′, thus admitting a volume of air between the paper tympan-sheet C′ and the printed sheet, and, upon the further return movement of the nipper-arms P, the crank-arm V′, with its roller W′, strikes upon the trip O, rising upon the same, opening the upper nippers T′, and releasing the printed sheet, which sheet, thus released and buoyed up by the air, glides freely from the paper tympan-sheet C′.

*a* is a spring to hold the nippers T and T′ together, and *b* a spring to hold the nippers T and T′ to the paper tympan-sheet C′. The nipper-arms P have hinged to their lower edge a griper-frame, $A^2$, upon which are placed the gripers $B^2$. This frame $A^2$ may be provided with slots, through which slots bolts pass, and, by means of these bolts, with their nuts, the gripers $B^2$ may be held in any desired position, the slots in said frame $A^2$ allowing the gripers $B^2$ to be regulated as may be desired. These gripers $B^2$ are for the purpose of holding the sheet upon and to the paper tympan-sheet C′ in order that it (the sheet) may be relieved in a proper manner from the form or types.

C′ shows a tympan-sheet of paper, one end of which is attached to the nipper-arms P directly under the nippers T and T′, while its other or opposite end is attached to the roller D′, which roller D′ is fastened to and moves with the vibrating platen C. An elastic cord or spring, E′, is wound around one end of this roller D′, one end of which cord E′ is fastened to the roller D′, and the other end to the vibrating platen C. This cord or spring E′ serves to wind up or roll up the paper tympan-sheet C′ upon the roller D′, and give the proper tension and smoothness to the paper tympan-sheet C′ necessary for the receiving, carrying, printing, and delivering of the sheet. F′ shows a feed-table, upon which the sheet to be printed is placed, in order that it (the sheet) may be taken therefrom by the nippers T and T′. This feed-table F′ is supported upon and by the rod G′, upon which it vibrates. This feed-table F′ has attached to it the supports *c*, supporting the rod H′, by which rod H′ the gages I′ are held. These gages I′ are bent or curved from their ends, against which the sheet is laid upward to the rod H′, upon which they are held, their curve at its commencement running nearly parallel with the feed-table F′, and gradually rising from the feed-table F′ until the gages I′ are in line with the rod H′, upon which they are held, the object of these gages I′ being to straighten the edge of the sheet to be taken by the nippers T and T′, should there be any upward curl of the edge of the sheet, as is frequently the case, and thus present the sheet properly and surely to the nippers T and T′. The rod H′ has upon one end the crank-arm J′, which crank-arm J′, as the feed-table F′ is depressed, strikes upon the upright *d*, thus raising the gages I′ and allowing the sheet to be taken from the feed-table F′ by the nippers T and T′.

This rod H′ may be slotted, and the gages I′ held to the same by means of bolts and nuts, thus rendering the gages I′ adjustable. Directly over the bed B, and parallel with the face of the form or types, is placed the ink-distributing cylinder 1. This cylinder 1 may be supplied with ink from a fountain in the usual way. Back of this ink-distributing cylinder 1 are placed an outer, 2, and an inner, 3, revolving ink-distributing table or disk. 4 are arms for the purpose of carrying the inking-rollers forward and backward over the form or types and the ink-distributing surfaces 1, 2, and 3, as said arms 4 rock or vibrate. These roller-arms 4 are connected together by a brace, 5, and form, as it were, a frame. These roller-arms 4 rock upon the shaft H, and are tied to and operated by the vibrating platen C by the connecting-piece 6. The inking-roller is held in the arms 4 by the rods 7, which rods 7 are made to play freely in the grooves in the arms 4. Upon the lower ends of said rods 7 are the spiral springs 8, for the purpose of holding the inking-roller down upon the ink-distributing surfaces 1, 2, and 3, and the form or types. The upper parts of said rods 7 are squared and made to fit into corresponding recesses in the arms 4. This squared part of the rods 7 is made sufficiently strong to bear the side strain caused by the inking-rollers in passing and repassing over the form or types, which side strain has heretofore been borne by the inking-roller arms or roller-frame, being elongated and slotted, in which slots the ends of the inking-rollers have been made to play freely, while the springs were simply employed to hold the rollers securely in such slots.

When desired to use more than one roller, a saddle-piece, 9, may be attached to the rods 7, as shown in Fig. 4.

The ink-distributing tables or disks 2 and 3 are operated by a ratchet, $P^2$, which ratchet $P^2$ is in turn operated by the motion of the vibrating platen C through the roller-frame, while the ink-distributing cylinder 1 is made to vibrate, and may be driven by a belt or gearing, as desired.

Operation: We will suppose the form or types to have been placed upon the bed B, the sheet to be printed laid upon the feed-table F′, against the gage I′, the paper tympan-sheet C′ occupying the inclined position shown in Fig. 3, and the nippers T and T′ in position to receive the sheet, the roller-arms 4 being at the lowest point of their vibration—the bottom of the bed B. Motion being communicated to the press, the cam M upon the blank L, through the lever-connection N, commences to throw back the trip O, lowering the feed-table F′, upon which table F′ the sheet is placed, thus bringing the sheet on a line with the upper face of the under nippers T, which nippers are raised above the face of the vibrating platen C. As the trip O continues its backward movement, the upper nippers T′ close upon the sheet, the feed-table F′ continuing to drop until the crank-arm J′ strikes upon the upright *d*, raising the gages I′.

The vibrating platen C, through the cranks G, now commences its upward movement toward the bed B, and the nipper-arms P, from their connection with the vibrating platen C, and guided by the stationary cams S on the inner sides of the frame A A, commence to descend toward the face of the vibrating platen C, carrying with them the nippers T and T′, which nippers T and T′ draw the sheet under the gage I′ and from the table F′. As the nipper-arms commence to descend toward the face of the vibrating platen C, the paper tympan-sheet C′ is unwound from the roller D′, and the sheet to be printed is drawn off the table F′ and falls upon the paper tympan-sheet C′, and, upon the continued movement of the vibrating platen C, the nipper-arms P are thrown down with the nippers T and T′, and the paper tympan-sheet C′ and the gripers $B^2$ are brought into a line with the face of the vibrating platen C. The vibrating platen C continues to advance until an impression is given. During the vibration of the platen C to the bed B the inking-rollers 4 have been carried up and over the form or types, and over the distributing-cylinder 1 and onto the revolving ink-distributing tables or disks 2 and 3.

An impression having been taken, the vibrating platen C, through the cranks G, commences its return movement from the bed B. When the vibrating platen C has moved a sufficient distance from the bed B to relieve the sheet from the form or types, the nipper-arms P, nippers T and T′, and griper-frame $A^2$, begin to ascend in their return movement toward the feed-table F′. The elastic cord E′, attached to the roller D′ and the vibrating platen C, as shown, causes the roller D′ to turn and wind up the paper tympan-sheet C′. The movement of the nipper-arms P continuing, the crank-arm V with its roller W, attached to the yoke U, (upon which yoke U are the nippers T and T′,) impinges upon the bracket X, raising the nippers T and T′ with the printed sheet from the paper tympan-sheet C′, and admitting a volume of air between the printed sheet and the paper tympan-sheet C′.

The paper tympan-sheet C′, attached to and operated by the nipper-arms P and roller D′, has now assumed the inclined position shown in Fig. 5, necessary for the delivery of the printed sheet, and the crank-arm V′ with its roller W′ strikes upon the trip O and rises upon the same, by which operation the upper nippers T′ are opened, and the printed sheet is released from their grasp.

In Fig. 5 the sheet is shown placed upon the feed-table F′ against the gages I′, to be taken by the nippers T and T′, laid upon the paper tympan-sheet C′, and in the act of being presented to the bed B in order that an impression may be taken and in the act of being delivered, after the paper tympan-sheet C′ has assumed the inclined position requisite to such delivery, the sheet in each position being designated by the heavy line.

During the return movement of the vibrating platen C the rollers 4 are carried from the revolving ink-distributing tables or disks 2 and 3 on and over the ink-distributing cylinder 1, taking their supply of ink therefrom, the ink having been previously distributed upon the same, and at the time of the delivery of the printed sheet, as shown, have very nearly reached the lowest point of their vibration. The succeeding sheet to be printed having been laid upon the feed-table F′, against the gages I′, and the nippers T and T′ having been raised above the vibrating platen C, it is taken from the table F′ by the nippers T and T′, and the operation previously described is repeated.

It is well known that, in job-printing, paper is used extensively for tympan-sheets, and there is nothing new in its use for such purpose. I do not, therefore, claim the use of paper for a tympan-sheet, save that such paper tympan-sheet should be used in the manner and for the purpose herein fully described.

It is of the greatest importance that the tympan-sheet used in my improvements should be of paper. Its cost is trifling. It may be put on and taken off the press almost instantly. In printing a job, already printed on one side, upon the reverse or opposite side, the sheet may be instantly changed to prevent any and all offset.

An impression is often given accidentally upon the tympan-sheet, and may occur many times in the working of every job. The importance then of changing the rolling tympan often, and at a slight cost, must be apparent, for were I to use cloth for a tympan thus operating, the frequent and constant change necessary would add so greatly to the expense of running the press that the objection would almost be fatal. The labor to be performed by this rolling tympan-sheet is so slight that the thinnest and most delicate sheet of paper may be used for this purpose, tissue-paper being sufficiently strong to perform the requisite duty. It will further be seen that the vibrating platen is so connected with the roller frame and with the nipper-arms, that they are operated by the movement of such vibrating platen, and that the ink-distributing tables are in turn operated by the rocking roller-frame, thus tying all these parts, as it were, together, the crank-motion imparted to the vibrating platen causing the whole of these motions from the simple vibrating movement given to the platen.

The present invention will be found to differ essentially from the invention patented by me April 23, 1861, in which I employed a platen to present the sheet to be printed to the form or types, which platen was supported by a shaft placed back of its face-line, or behind it, and to which platen a double movement was imparted, namely, moving from a horizontal position occupied in receiving the sheet into a position parallel with the face of the form or types, and then in a direct line to the form or types that an impression might be received. In the present instance the platen is hung upon a shaft in line with its face, occupies an angular position to the form or types, and has but one movement, namely, a vibrating one, from the angular position to the bed, that an impression may be given, and then vibrates back to its former position, that the printed sheet may be removed, and the next to be printed be placed upon it.

Having thus described my invention, what I claim therein as new, and desire to secure by Letters Patent, is—

1. A paper tympan-sheet, which can be unwound and wound up by means substantially as described, for the purpose of receiving the sheet to be printed from the feed-table, properly presenting the same to the form or types, and conveying the printed sheet from the form or types to the pile-table of the press.

2. The combination of the nippers, swinging levers P, supporting the rod U, gripers and vibrating platen, substantially as and for the purpose specified.

3. The combination of the swinging levers P, supporting the rod U, provided with the nippers, the rolling tympan-sheet, and the vibrating platen, substantially as and for the purposes specified.

4. The combination of the swinging levers

P, supporting the rod U, provided with the nippers, with a vibrating feed-table, substantially as and for the purposes set forth.

5. The combination of a vibrating feed-table, with the gages bent or curved from their ends, against which the sheet is laid, upward to the rod H′, supporting them, substantially as and for the purposes specified.

6. The combination of a stationary bed with the roller frame or arms, rocking upon a shaft, as shown, and holding and carrying the rollers to and fro over the form and inking-surfaces, for each impression, and a platen vibrating substantially as described, for the purposes fully described.

7. The combination of a stationary bed, with the roller frame or arms rocking upon a shaft, as shown, and holding and carrying the rollers to and fro over the form and inking surfaces for each impression, a platen vibrating substantially as described, and a revolving ink-distributing table, for the purposes fully described.

8. The combination of the rocking roller-arms 4, connecting piece 6, and vibrating platen C, substantially as and for the purpose indicated.

9. The rocking roller-arms, in combination with the rod and springs, when such rod shall hold and carry the roller or rollers independent of any fingers projecting from the arms, for the journals of the rollers to move in, substantially as described.

GEO. P. GORDON.

Witnesses:
A. SIDNEY DOANE,
W. E. WINSLOW.